Figure 1:
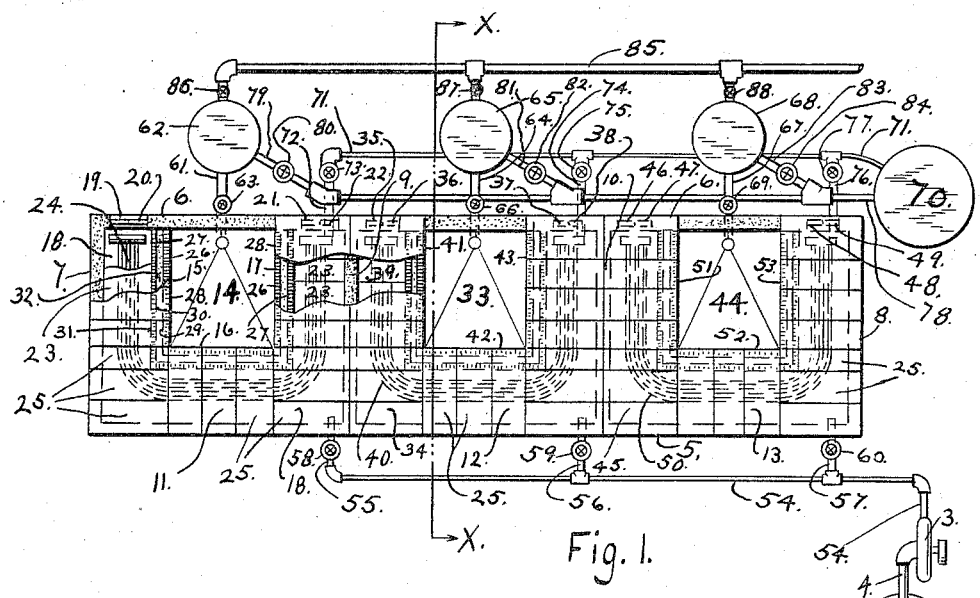

J. W. ROCHE.
SEWAGE DISPOSAL MEANS.
APPLICATION FILED AUG. 18, 1913.

1,182,316.

Patented May 9, 1916.

WITNESSES:

INVENTOR
John William Roche,
By his attorney,
J. Edward Thebaud.

UNITED STATES PATENT OFFICE.

JOHN WILLIAM ROCHE, OF HORNELL, NEW YORK, ASSIGNOR OF ONE-FOURTH TO JOHN G. KELLEY, JR., OF HORNELL, NEW YORK, AND ONE-HALF TO CHARLES A. HAGER, OF PERRYSBURG, NEW YORK.

SEWAGE-DISPOSAL MEANS.

1,182,316.　　　　Specification of Letters Patent.　　Patented May 9, 1916.

Application filed August 18, 1913. Serial No. 785,426.

*To all whom it may concern:*

Be it known that I, JOHN WILLIAM ROCHE, a citizen of the United States, residing at Hornell, in the county of Steuben and State of New York, have invented certain new and useful Improvements in Sewage-Disposal Means; and I declare the following to be a full, clear, and exact description of my invention, such as will enable others skilled in the art to which it appertains to make and use the same, reference being had to the accompanying drawings, and to figures of reference marked thereon, which form part of this specification.

Like figures refer to like parts.

My invention relates to means for disposing of sewage.

The objects of my invention are to provide means for rendering sewage harmless without the use of chemicals and for reclaiming its fertile ingredients in a practical and efficient manner.

Raw sewage, exclusive of trade wastes, contains salts in solution, solid matter in suspension and bacteria. To separate the solid matter I provide a vertical screen. To change the salts and destroy the bacteria and alter the obnoxious gases, I provide a wall built up of electrolytic and other filter elements, the said screen being one of the elements and an adjoining floor, made up of iron plates, being another of the elements, which produce the electrolytic action. The said iron floor is positioned outside the said screen and has means for heating and drying the residue left from the sewage. After the sewage has filtered through the said wall, it is passed through a tank, where the filtrate is sterilized and allowed to flow, in a harmless condition, to some water course.

The means which constitute a sewage disposal plant, embodying my invention, are illustrated in the drawings and described in this specification, the operation of said means is explained and what I claim is set forth.

Figure 2:
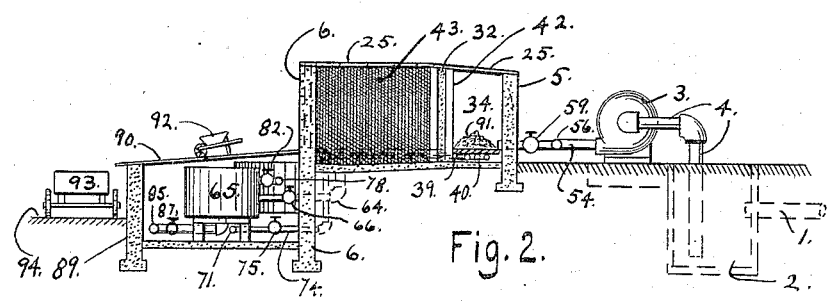
Figure 3:
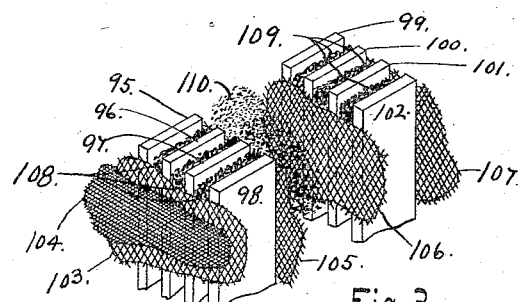

In the drawings, Figure 1 is a plan view of my invention for the disposing of sewage. Fig. 2 is a vertical section taken on the line X—X of Fig. 1, with some additional details. Fig. 3 is a fragmental view of a galvanic filter wall shown in the other two figures.

In Fig. 1, 1 is the end of a sewer leading into a well 2. 3 is a centrifugal pump connected by a pipe 4 with the well 2. A large rectangular reservoir is shown having a front wall 5, a rear wall 6 and end walls 7 and 8. This reservoir is divided into three compartments by the partition walls 9 and 10. The said compartments are numbered respectively 11, 12 and 13. Within the compartment 11 is the basin 14, formed by means of the three filter walls 15, 16 and 17 and the wall 6. The basin 14 forms, with the walls of the compartment 11, an alley 18. Water-tight doors, numbered respectively 19, 20, 21 and 22 are positioned in the ends of the alley 18, in the rear wall 6. Iron or steel plates 23, covering a heating coil 24, form the floor of the alley 18. The top of the alley 18 is roofed over with a series of closely laid hatch doors or plates 25. The filter walls 15, 16 and 17 are made up of a series of inner slats 26, and a series of outer slats 27, with a coarse brass screen fixed upon each of the surfaces 28, 29, 30 and 31 and a fine brass screen fixed upon top of the screened surface 31. Between the slats of each series I place animal charcoal and between the two slat series of each wall I place silica sand, as at 32. Within the compartment 12 is the basin 33 surrounded by the alley 34 having water-tight doors 35, 36, 37 and 38, in the rear wall 6. Iron or steel plates 39, covering a heating coil 40, form the floor of the alley 34. The filter walls 41, 42 and 43 are similar in construction to the walls 15, 16 and 17 of the basin 14. Within the compartment 13 is the basin 44, surrounded by an alley 45, having water-tight doors 46, 47, 48 and 49. This alley 34 has a floor of iron or steel plates, over a heating coil numbered 50, similar to those in the other alleys mentioned and the filter walls 51, 52 and 53 are similar in construction to those filter walls 15, 16 and 17 of basin 14. The alleys 34 and 45 are roofed with series of closely laid hatch doors or plates 25, similar to those forming the roof of alley 18. Connecting the compartments 11, 12 and 13, with the pump 3, is a pipe 54, having branches 55, 56 and 57 in which are respectively the valves 58, 59 and 60, whereby any of the compartments can be shut off while filling the others. Connected with each of said basins is a sterilizing tank positioned so that the filtrate can drain from the basin to the tank. Basin 14 is connected by pipe 61 with the tank 62, there being a valve 63 in the pipe 61. Basin 33 is connected by pipe 64 with the tank 65, and in the pipe 64 is a valve 66. Basin 44 is connected by pipe 67 with tank 68, there being a valve 69 in the pipe 67. A steam boiler 70 is shown connected by piping 71 to the heating coils by branch pipes. The branch 72 has a valve 73 and connects with coil 24. The branch 74 has a valve 75 and connects with coil 40. The branch 76 has a valve 77 and connects with coil 50. Another pipe 78 connects the steam boiler 70 with the sterilizing tanks. A branch 79 of the pipe 78 connects with the tank 62 and has a valve 80. A branch 81, having a valve 82 connects with the tank 65; while another branch 83 of the pipe 78 is connected with the tank 68, and a valve 84 is in the branch 83. All of said tanks are connected by a drain pipe 85, into which they drain; there being a valve 86 at the outlet of tank 62; a valve 87, at the outlet of tank 65, and a valve 87 at the outlet of tank 68 all leading into the drain pipe 85.

In Fig. 2, is shown a section illustrating the relative vertical position of the parts shown in plan in Fig. 1. In addition to the walls 5 and 6, is shown a wall 89 and a roof 90 over the sterilizing tank 65. In the alley 34 is shown an accumulation of dried sludge 91. 92 is a wheel barrow upon the roof 90. 93 is a cart standing upon a roadway 94 below the roof 90.

In Fig. 3, 95, 96, 97 and 98 are wooden slats of an outer series, and 99, 100, 101, 102 are slats of an inner series in a filter wall. Upon the outside of the slats 95, 96, 97 and 98 is fastened a coarse brass screen of about 35 meshes per square inch, 103, upon which is attached a fine brass screen 104 of about 90 meshes per square inch, Coarse screens numbered 105, 106 and 107 similar to screen 103, are fastened to the slats as shown. Between the slats 95, 96, 97 and 98 is placed animal charcoal 109. Between the two screens 105 and 106 is packed silica sand 110 to complete the filter wall.

In operation, sewage drains from the sewer pipe 1 into the well 2, from which it is pumped by the pump 3 through the pipe 4 into the pipe 54 and through the branches 55, 56 and 57 into the respective compartments 11, 12 and 13. By means of the valves 58, 59 and 60 any one of the said respective compartments can be shut off from the pump 3. Assuming that the alley 18 of compartment 11 has been filled with sewage and the valve 58 has been closed, the liquid filters through the walls 15, 16 and 17 into the basin 14 and on account of the fine screen on the surface 31 of the said filter walls, the solids in suspension in the sewage remain in the alley 18 and drop upon the floor plates 23. The electrolytic action set up by means of the metallic elements which are electro-positive to carbon and carbon elements in the floor of the alley 18 and the filter walls of the basin 14 results in the formation of a precipitate which also drops upon the floor plates 23 of alley 18. The filtrate collected in basin 14 is next drained off through the pipe 61 and the open valve 63 into the sterilizing tank 62; the valve 86 having previously been closed. Steam from the boiler 70 is admitted into the tank 62 through the pipes 78 and 79 and the valve 80 to boil the filtrate contained in the tank 62 and destroy what germ life there might be left in the filtrate which had passed through the filter walls 15, 16 and 17. The valve 63 is next closed and the valve 86 is open to allow the sterilized filtrate to drain off through the pipe 85. The sludge which has accumulated upon the plates 23 during the draining of the basin 14 is next dried by means of the heat produced in the coil 24 which derives its heat from the boiler 70 through the pipes 71 and 72 and the valve 73. After the sludge has been thus dried the water-tight doors 19, 20, 21 and 22 are open and fresh air is admitted to the alley 18. The dried sludge is next removed by wheel barrow and other means and transported away from the plant and used as a fertilizer if desired. After the alley 18 has been cleaned out the water-tight doors 19, 20, 21 and 22 are closed and the compartment 11 is then ready for another supply of sewage to be treated in the manner just described for the quantity first pumped in. The compartments 12 and 13 with their respective filter walls, piping connections and sterilizing tanks are available for use in a manner similar to that described for the compartment 11. The filtering operation can be carried on in two compartments at the same time while the dried sludge is being removed from the third compartment. In fact, any desired arrangement in the use of the various compartments can be had by manipulating the valves 58, 59, 60 and the other valves connected with the sterilizing tanks.

I have found that the obnoxious gases coming from the sewage are altered in connection with the use of the electrolytic elements just described. The free oxygen produced by the electrical action of the electrolytic elements passing through the watery sewage, no doubt explains the cause for the change in the obnoxious gases.

By removing any of the hatch doors 25 access to any of the alleys can be had from above.

Having described my invention, I claim,

1. In a device adapted for disposing of sewage, a sewage reservoir, a basin separated from said reservoir, filter walls separating said basin from said reservoir, said filter walls being composed of an inner and an outer series of spaced slats positioned transverse to said wall, metallic screens, electro-positive to carbon, adjoining said slats, sand positioned between the inner and outer series of slats in said filter walls, carbon positioned between said slats and electrically connected with said screens, whereby an electrolytic action is set up, metallic plates forming the floor of the space between said filter walls and the walls of said reservoir.

2. In a device adapted for treating sewage, means forming a sewage reservoir, means forming a filtrate basin, a filter wall between said basin and said reservoir said filter wall being composed of two series of spaced slats positioned across said filter wall, metallic screens electro-positive to carbon fixed to the inner and outer surfaces of said series of slats, an extra fine metallic screen fixed upon said filter wall next said reservoir, sand positioned between said series of spaced slats, and carbon positioned between said slats in each series, and electrically connected with said screens, whereby electrolytic action is set up.

3. A filter wall for electrolytic purification of fluids, comprising a plurality of parallel screens of material electro-positive to carbon, a plurality of slats of nonconducting material arranged transversely of said wall, and between said screens, a plurality of bodies of carbon alternating with said slats and filling the spaces between adjacent slats and electrically contacting with said screens, whereby electrolytic action is set up.

4. A filter wall for electrolytic purification of fluids, consisting of three parallel filter strata, each of the outer of said strata comprising a series of spaced slats arranged transversely to the wall, metallic screens of material electro-positive to carbon, positioned one on each side of each series of slats, a plurality of bodies of carbon alternating with said slats and filling the spaces between adjacent slats and electrically contacting with said screens, whereby an electrolytic action is set up, the intermediate of said filter strata consisting of filtering material arranged between the inner adjacent metallic screens of said series of slats.

JOHN WILLIAM ROCHE.

Witnesses:
J. EDWARD THEBAUD,
E. LOUESE LADD.

Copies of this patent may be obtained for five cents each, by addressing the "Commissioner of Patents, Washington, D. C."